United States Patent
Yli-Vakkuri

(10) Patent No.: US 6,983,624 B2
(45) Date of Patent: *Jan. 10, 2006

(54) APPARATUS FOR BENDING GLASS PANELS

(75) Inventor: Erkki Yli-Vakkuri, Tampere (FI)

(73) Assignee: Tamglass Ltd. Oy, Tampere (FI)

( * ) Notice: Subject to any disclaimer, the term of this patent is extended or adjusted under 35 U.S.C. 154(b) by 499 days.

This patent is subject to a terminal disclaimer.

(21) Appl. No.: 10/084,464

(22) Filed: Feb. 28, 2002

(65) Prior Publication Data

US 2002/0116953 A1 Aug. 29, 2002

(30) Foreign Application Priority Data

Feb. 28, 2001 (FI) .............................................. 20010400

(51) Int. Cl.
C03B 23/025 (2006.01)

(52) U.S. Cl. .......................................... 65/274; 65/285
(58) Field of Classification Search .................... 65/273, 65/274, 268, 102, 107, 104, 285
See application file for complete search history.

(56) References Cited

U.S. PATENT DOCUMENTS

| 4,497,645 A | 2/1985 | Peltonen |
| 4,986,842 A | 1/1991 | Peltonen |
| 5,306,324 A * | 4/1994 | Vehmas et al. ................ 65/104 |
| 5,437,704 A | 8/1995 | Yli-Vakkuri et al. |
| 5,470,367 A | 11/1995 | Salonen et al. |
| 5,472,469 A * | 12/1995 | Yli-Vakkuri et al. .......... 65/107 |
| 2003/0230116 A1 * | 12/2003 | Yli-Vakkuri ................. 65/273 |
| 2004/0050107 A1 * | 3/2004 | Yli-Vakkuri ................. 65/273 |
| 2004/0083763 A1 * | 5/2004 | Lambert ....................... 65/119 |

FOREIGN PATENT DOCUMENTS

| DE | 1 027 852 B | 4/1958 |
| GB | 768780 | 2/1957 |
| GB | 2 320 021 A | 6/1998 |
| WO | WO 93/06052 A1 | 4/1993 |

* cited by examiner

Primary Examiner—Steven P. Griffin
Assistant Examiner—Carlos Lopez
(74) Attorney, Agent, or Firm—Buchanan Ingersoll PC; Burns Doane Swecker & Mathis

(57) ABSTRACT

The invention relates to an apparatus for bending glass panels. An upper tier of successive mould carriages (9) defines a number of heating stations, the final one being an actual bending station (4b). A lower tier of successive mould carriages (9) defines a number of cooling stations (5, 6, 7), which are located underneath the heating stations. The mould carriages have an open-structured or otherwise highly heat transmitting floor (10). A pre-bending station (4a) preceding the bending station (4b) and at least the final preheating station (3b) have a floor (15), on top of which are radiation heating elements (16) positioned below a floor (10) of the carriage (9) for speeding up the heating of a bottom glass panel for preventing it from falling behind from the heating of a top glass panel.

6 Claims, 2 Drawing Sheets

APPARATUS FOR BENDING GLASS PANELS

Figure 1:
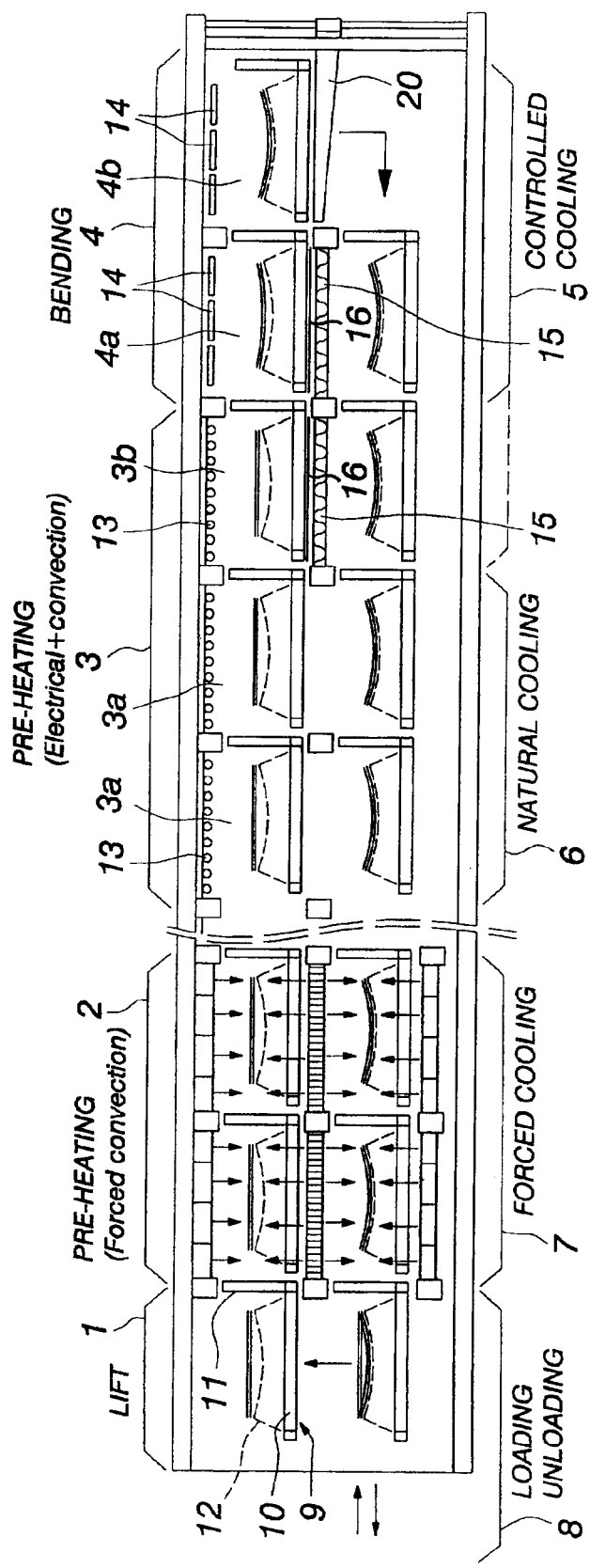

The invention relates to an apparatus for bending glass panels, said apparatus comprising an upper tier of successive mould carriages, having a front or back wall thereof separating successive preheating stations and one or more successive bending stations from each other, said mould carriages being adapted to be intermittently movable towards the bending station;

a lower tier of successive mould carriages, having a front or back wall thereof separating successive cooling stations from each other, said mould carriages being adapted to be intermittently movable in a direction opposite to the moving direction of the upper tier carriages;

a number of bending moulds supported by the mould carriages;

radiation heating elements in the ceiling of the preheating stations at least in some of the preheating stations;

radiation heating elements in the ceiling of one or more bending stations;

an intermediate floor which separates the pre-bending station upstream of the bending station and/or at least the last preheating station from a station therebelow;

a lift mechanism which constitutes a floor for the bending station for lowering the mould carriages from the upper tier to the lower tier together with bent glass panels;

the mould carriages being provided with an open-structured or otherwise highly heat transmitting floor.

This type of apparatus is prior known from the Applicant's patent publications U.S. Pat. No. 4,497,645 and U.S. Pat. No. 4,986,842. This apparatus has been found very useful in the process of bending pairs of glass panels set on top of each other, which are intended to be subsequently laminated together for use e.g. as an automotive windshield. In the initial stage of preheating, the heat delivered by glass panels presently cooling in the cooling stations can be effectively exploited for heating glass panels to be heated in the heating stations. The final preheating stations no longer have this possibility, since the temperature difference between a pair of glass panels to be heated in the heating station and a pair of glass panels in the process of cooling therebelow remains small. Since a pair of glass panels in the preheating stations and in one or more pre-bending stations is subjected to heating by overhead radiation heat, the result is that, at least in the final preheating station and pre-bending station, the bottom panel of the pair of glass panels heats more slowly than the top panel. Thus, the bottom panel resists bending, resulting in a slower bending operation or leading to unnecessary overheating of the top panel. Also, the management of bending contour based on temperature distribution becomes more difficult.

It is an object of the invention to improve the above type of apparatus in order to overcome said problems.

According to the invention, this object is achieved in such a way that on top of the intermediate floor are radiation heating elements positioned below the floor level of the mould carriage.

This inventive solution provides in the final stage of heating a balance between top and bottom heating, i.e. is able to minimize the temperature difference between superimposed glass panels. Thus, the bottom panel exhibits less resistance to bending and the pressure between the panels is reduced. At the same time, the management of bending contour is also improved, i.e. the temperature distribution can be used for giving the glass a desired bending curvature. The optics of a bent glass panel will be better, which is important when the angle is small between the windshield and horizontal plane.

Figure 2:
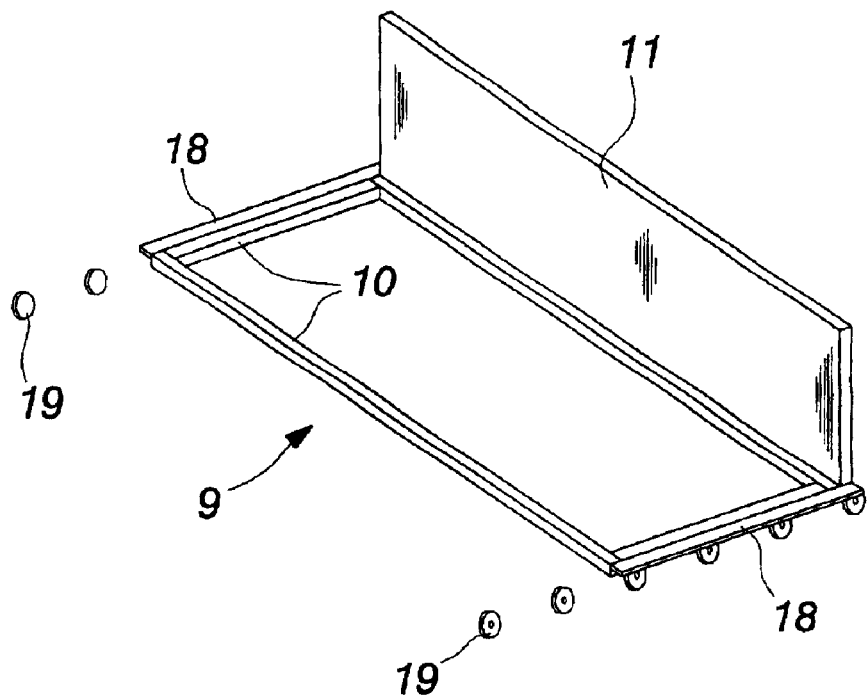
Figure 3:
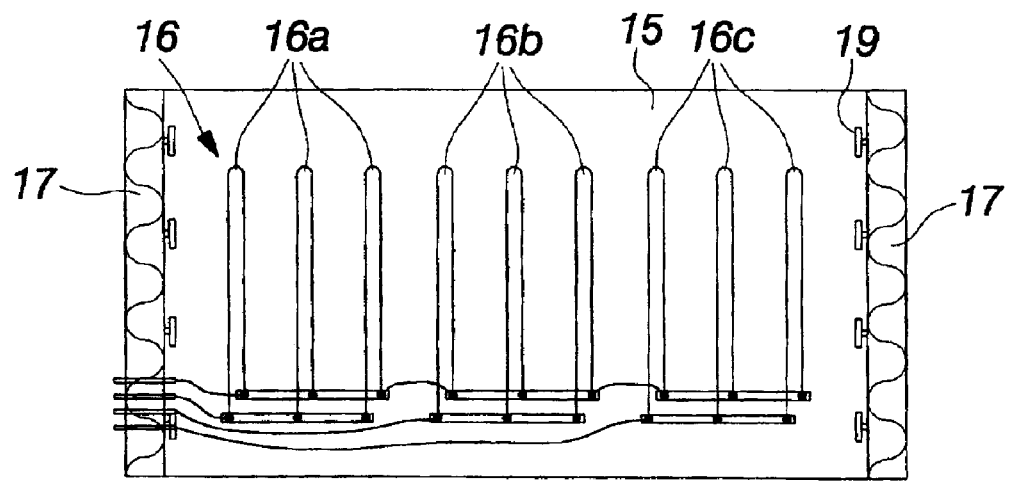

The invention will now be described in more detail with reference made to the accompanying drawings, in which FIG. 1 shows an apparatus of the invention in a schematic vertical section;

FIG. 2 shows in a schematic perspective view a mould carriage for the apparatus; and FIG. 3 shows in a plan view an intermediate floor for a final preheating station 3b or a first pre-bending station 4a, provided with radiation heating elements 16 on top of the same.

The apparatus of FIG. 1 comprises an upper tier of successive mould carriages 9, having a front wall 11 thereof separating successive preheating stations 2, 3 and one or more successive bending stations 4a, 4b from each other. Underneath the upper tier is a lower tier of successive mould carriages 9, having a back wall 11 thereof separating successive cooling stations 5, 6, 7 from each other. In the upper tier, the mould carriages 9 are adapted to move towards a bending station 4b and the lower tier carriages are adapted to move in the opposite direction. The bending station 4b has its floor constituted by a lift mechanism 20 for descending the mould carriages 9 from the upper tier to the lower tier together with bent glass panels. Each mould carriage 9 is provided with a bending mould 12 supported by the mould carriage 9. A pair of glass panels is placed on the bending mould 12 while the mould carriage 9 is outside the furnace in a loading and unloading station 8. Then, the carriage 9, the mould 12, and the pair of glass panels to be bent are raised by a lift 1 of the loading and unloading station 8 to the upper tier of mould carriages, wherein the mould carriages are advanced intermittently through a distance substantially equal to the length of a carriage towards the bending station 4b. This advancing stretch includes first preheating stations 2, wherein heating is based on forced convection, the thermal energy therefor being obtained from glass panels presently cooling in lower cooling stations 7 by way of forced convection. Thus, the cooling stations 7 are capable of speeding up the cooling process of glass panels to be cooled and the heating stations 2 are capable of speeding up the heating of glass panels to be heated, while thermal energy from glass panels to be cooled can be exploited more efficiently. In addition to this, glass panels emerging from the furnace are colder than before and, on top of that, a smoother cooling and a smoother heating of glass panels will be obtained. The structural and functional aspects of stations 2 and 7 are described in more detail in the Applicant's patent publication U.S. Pat. No. 4,986,842.

Next, the upper tier carriages 9 arrive in preheating stations 3, wherein principal heating of glass panels is effected by way of radiation heating. Therefor, the ceiling of stations 3 is provided with electrically heated radiation heating resistances 13.

Preheating stations 3a can be additionally used for heating glass panels with thermal energy, which is released from glass panels in the process of cooling in lower cooling stations 6 and which rises by way of natural convection through open-structured floors 10 of the carriages 9. This recovery of heat based on natural convection has been explained in more detail in the Applicant's patent publication U.S. Pat. No. 4,497,645. This natural convection can be enhanced by weak micro-convectional blasting as disclosed in more detail in the Applicant's patent publications U.S. Pat. No. 5,437,704 and U.S. Pat. No. 5,472,469.

The last preheating station 3b is different from the preceding stations 3a in the sense that between the heating station 3b and a cooling station 5 therebelow is a thermally insulated intermediate floor 15 and on top of this intermediate floor are radiation heating elements 16 set below the level of the floor 10 of the carriage 9. The radiation heating elements 16 provide heating through the open-structured floor 10 of the carriage 9 for the bottom panel of a pair of glass panels presently in the station 3b. The floor 10 need not be a totally open structure as it can be partially closed e.g. by a thin perforated sheet, a screen or the like, which provides a passage for both convection air in the preceding stations and radiation heat from the heating elements 16. FIG. 2 illustrates bars 18 at the ends of the floor skeleton 10 of the carriage 9 for supporting the carriages on rollers 19 mounted with bearings on side walls 17 (FIG. 3) of a furnace.

FIG. 3 illustrates an example of the radiation heating elements 16 placed on top of the intermediate floor 15. Such elements can be open resistances, which are divided for resistance rod elements 16a, 16b and 16c adjacent to each other in a lateral direction of the station and having individually adjustable heating effects.

The final preheating station 3b is followed by a pre-bending station 4a, wherein temperature of the glass panels becomes so high that the pair of glass panels begins to sag upon the ring mould 12 supporting the same. Between the pre-bending station 4a and the cooling station 5 therebelow is also an intermediate floor 15, on top of which are radiation heating elements 16. Since there is just a minor temperature difference between the stations 3b and 4a when compared to the temperature of the cooling stations 5 therebelow, the thermal energy from glass panels in the process of cooling down there cannot be effectively exploited in these stations and, consequently, a much more significant advantage is gained by using the intermediate floor 15 and the radiation heating elements 16 on top of it. The bottom radiation heating elements 16 can be used for minimizing a temperature difference between top and bottom glass panels, whereby a pressure between the glass panels is reduced and the bottom panel offers less resistance to bending. The glass panel develops an optically uniform curve. This is facilitated by the fact that the resistance rods functioning as radiation heating elements extend lengthwise of the furnace and, thus, a laterally directed power regulation profile is obtained. Especially the heating effect underneath the middle section and ends of a glass panel can be individually adjusted.

Resistances 14 in the ceiling of the bending stations 4 are conventionally resistances extending lengthwise of the furnace, which are divided in a lengthwise direction of the furnace in three successive groups, each of said groups including in a lateral direction of the furnace a large number of adjacent resistances which can be optionally switched on and off. Regulation of the resistance panel in a bending station has been described in more detail in the Applicant's patent publication U.S. Pat. No. 5,470,367. In the bending station 4b, the sagging or bending of a pair of glass panels to a desired contour can be detected in a variety of ways. One way is to measure a glass panel temperature by means of a pyrometer, which has been calibrated experimentally and fed into a data system controlling operation of the furnace. Another way is to monitor the deflection of a glass panel by means of optical measuring instruments. A combination of both these methods is also viable.

When a pair of glass panels has sagged in the station 4b to a desired contour, the mould carriage is descended by means of the lift mechanism 20, which constitutes a floor for the bending station 4b, from the upper tier down to the lower tier. At the same time, the pair of glass panels begins its cooling and the controlled (sufficiently slow) cooling continues in the cooling stations 5 underneath the intermediate floors 15.

The preheating stations 3a, which have no intermediate floors, can also be provided with heating resistances between superimposed stations, whereby reflectors are positioned therebelow for preventing the resistances from heating glass panels presently cooling down below. However, the resistances are capable of applying heat through the open carriage floor to glass panels presently in the preheating stations 3a. This occurs by way of direct radiation heat and, further, by applying more heat to the air rising as a result of natural convection from glass panels in the process of cooling below up to the preheating stations 3a.

The preheating stations 2 operating by way of forced convection can also be provided with floor resistances on top of convectional blowpipes or boxes present between superimposed stations.

The invention is not limited to the above described exemplary embodiment. For example, the arrangement and orientation of floor resistances may vary. The numbers of various types of preheating stations 2 and 3 may vary considerably. The same applies to the number of pre-bending stations 4a. The larger the number of stations, the higher the production capacity and the shorter the residence time in each station.

I claim:

1. An apparatus for bending glass panels, said apparatus comprising:

an upper tier of successive mould carriages, having a front or back wall thereof separating from each other at least the following stations: successive preheating stations including a last preheating station, a bending station, and at least one pre-bending station upstream of the bending station, said mould carriages being adapted to be intermittently movable towards the bending station;

a lower tier of successive mould carriages, having a front or back wall thereof separating successive cooling stations from each other, said mould carriages being adapted to be intermittently movable in a direction opposite to the moving direction of the upper tier carriages;

a number of bending moulds supported by the mould carriages;

first radiation heating elements in the ceiling of the preheating stations at least in some of the preheating stations;

second radiation heating elements in the ceiling of the pre-bending and bending stations;

an intermediate floor which separates the at least one pre-bending station and the last preheating station from a cooling station therebelow;

a lift mechanism for lowering the mould carriages from the upper tier to the lower tier together with bent glass panels; and third radiation heat elements disposed on ton of the intermediate floor;

wherein the mould carriages have an open-structured or otherwise highly heat transmitting floor, and the third radiation heating elements are positioned below the level defined by the floor of the mould carriage; and wherein the third radiation heating elements are disposed adjacent to one another in a lateral direction relative to at least one of the last preheating station and the at least one pre-bending station.

2. The apparatus as set forth in claim 1, wherein the third radiation heating elements comprise open resistances.

3. The apparatus as set forth in claim 1, wherein the third radiation heating elements are formed as resistance rod elements having individually adjustable heating effects.

4. The apparatus as set forth in claim 1, wherein the third radiation heating elements have a lengthwise direction which is the same as that of the furnace, wherein the third radiation heating elements include at least an upstream radiation heating element, a middle radiation heating element, and a downstream radiation heating element, the middle radiation heating element having a heating effect which is individually adjustable relative to the heating effect of the upstream and downstream heating elements on either side thereof such that the heating effects below the middle section and end sections of a pair of glass panels to be bent are adjustable relative to each other.

5. The apparatus as set forth in claim 1, wherein the floor of one or more preheating stations is open and provided with heating resistances, with reflectors underneath the last preheating station.

6. The apparatus as set forth in claim 1, comprising preheating stations in an upstream end of the upper tier of successive mould carriages, in which the heating of glass panels is effected by applying forced convection which receives its thermal energy from glass panels in a cooling process in downstream stations of the lower tier of successive mold carriages, wherein heating resistances are mounted on top of convectional blowpipes or boxes present on the floor of the preheating stations.

* * * * *

UNITED STATES PATENT AND TRADEMARK OFFICE
CERTIFICATE OF CORRECTION

PATENT NO. : 6,983,624 B2 Page 1 of 1
APPLICATION NO. : 10/084464
DATED : January 10, 2006
INVENTOR(S) : Erkki Yli-Vakkuri It is certified that error appears in the above-identified patent and that said Letters Patent is hereby corrected as shown below:

Column 4, Claim 1, Line 58: change "ton" to --top--.

Signed and Sealed this

Twentieth Day of May, 2008

JON W. DUDAS
*Director of the United States Patent and Trademark Office*